Feb. 7, 1961    O. BARTHRUFF    2,970,509
CAMERA VIEWFINDER ATTACHMENT FOR VARYING THE FIELD OF VIEW
Filed April 17, 1956

INVENTOR:
Otto Barthruff
By: Michael S. Striker
agt.

United States Patent Office 2,970,509
Patented Feb. 7, 1961

2,970,509

CAMERA VIEWFINDER ATTACHMENT FOR VARYING THE FIELD OF VIEW

Otto Barthruff, Stuttgart, Germany, assignor to Eugen Bauer G.m.b.H., Stuttgart-Unterturkheim, Germany Filed Apr. 17, 1956, Ser. No. 578,837

Claims priority, application Germany Apr. 18, 1955

2 Claims. (Cl. 88—1.5)

The present invention relates to a new and improved camera arrangement. More particularly, the present invention relates to a new and improved camera arrangement wherein the field of view of the viewfinder used with the camera can be easily and quickly varied to accommodate different objective lenses used with the camera.

Conventional camera arrangements are provided with at least one viewfinder and one objective lens. The relative positions between the viewfinder and the objective lens are fixed in the camera housing so that a person using the camera will see a field of view therethrough which substantially corresponds to the field of view "seen" by the objective lens. That is, since the position of the film in the camera is accurately determined with respect to the objective lens, the type of objective lens used determines the extent of the viewed objects which appear on the film.

It is of course desirable to have the field of view seen through the viewfinder correspond exactly to the field of view of the objective lens. In moving picture cameras, for example, the scene can be continuously varying so that the cameraman sighting through the viewfinder must at all times know exactly what is being registered on the film in the camera. In order to take different types of photographs, it is common practice to change the objective lens or to add an auxiliary lens thereto which varies the field of view seen by the objective lens and registered on the film. For example, a telephoto lens is sometimes attached to the objective lens. In such an arrangement, the field of view seen by the lens is much smaller than when the conventional objective lens is used.

Therefore, when the objective lens is modified or changed, some arrangement must be provided to indicate to the cameraman how the field of view seen through the viewfinder has been modified. In some conventional arrangements, a plurality of objective lens are mounted on a revolving turret. The turret can then be rotated to position the desired objective lens into the working position. If the viewfinder is modified by apparatus operated by the same revolving turret, it is seen that all this auxiliary apparatus must be mounted on the camera all of the time. That is, even though only one objective lens and one viewfinder is being used at any one time, the camera is burdened by the extra mass and weight of the additional objective lenses and viewfinder modifying means.

In addition, the above camera arrangement limits the number of ways in which the field of view of the viewfinder can be varied. That is, the field of view of the viewfinder can only be varied in a fixed number of ways depending upon the modification means already mounted on the camera. If the objective lens of the camera is varied in some manner, other than by the revolving turret mechanism, the field of view of the viewfinder cannot be varied in a corresponding fashion.

It is accordingly an object of the present invention to overcome the above described disadvantages of viewfinder varying arrangements found in conventional camera arrangements.

A second object of the present invention is to provide a new and improved camera arrangement wherein the field of view of the viewfinder of the camera can be varied in any desired manner to substantially correspond to the objective lens of the camera.

Another object of the present invention is to provide a camera arrangement where the field of view of the viewfinder may be quickly and easily modified to correspond to the objective lens of the camera.

A further object of the present invention is to provide a view varying means for a viewfinder of a camera, which varying means can be resiliently mounted on the housing of the camera to vary the field of view of the viewfinder in a desired manner.

Still another object of the present invention is to provide a view varying means which can be quickly and easily mounted and removed from the camera housing and which contains a plurality of view varying means for varying the field of view of the viewfinder by different amounts depending on the mounting position thereof.

Still a further object of the present invention is to provide a transparent and elastic view varying means for the viewfinder of a camera.

With the above objects in view the present invention mainly consists of an apparatus for use in a camera having a viewfinder in the camera housing and including a mounting member adapted to be removably attached to the camera housing and view varying means carried by the mounting member and cooperating with the viewfinder to vary the field of view of the viewfinder in a predetermined manner.

In another embodiment of the present invention position fixing and locating means are respectively formed in the camera housing and in the view varying means to accurately position the mounting member on the camera housing to align the axis of the viewfinder with the axis of the field of view varying means.

In still a further embodiment of the present invention the mounting member carries a plurality of view varying means which vary the field of view of the viewfinder by respectively different amounts depending on the mounting position of the mounting member on the camera housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
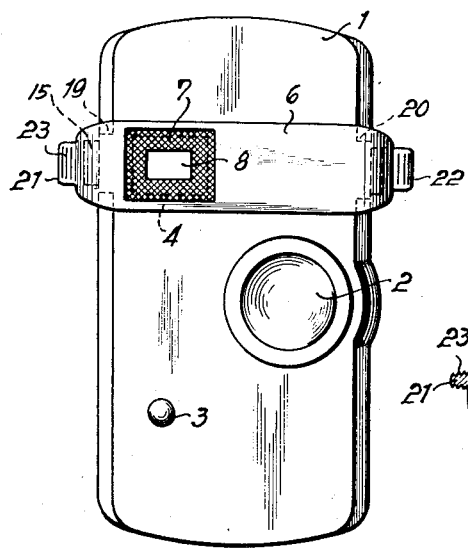
Fig. 1 is a front elevational view of a camera having a view varying means constructed in accordance with the present invention attached to the camera housing.
Figure 2:
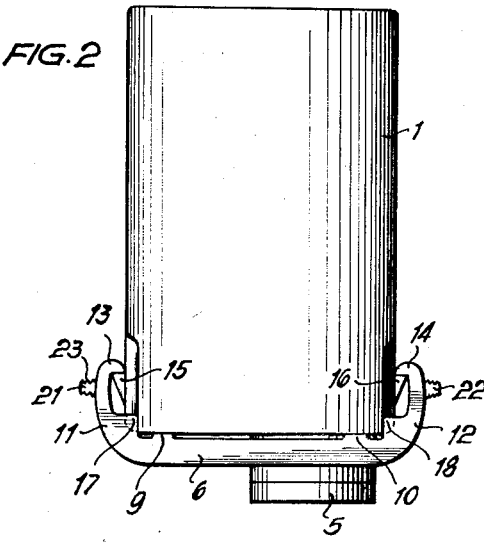
Fig. 2 is a plan view of the arrangement illustrated in Fig. 1.

Referring to the drawings and more particularly to Figs. 1 and 2, and it can be seen that the camera arrangement includes a camera housing 1 having an objective lens 2 mounted on the front wall thereof. Slightly below and to the left of the objective lens 2 is a switch member 3 for operating the film transport mechanism of the motion picture camera illustrated.

Directly above the switch member 3 and extending through the front wall of the camera housing 1 is the front window of the viewfinder 4. The front window 4 is seen only in dotted lines in Fig. 1 since it is partially covered by an opaque framing member 7 which is in turn carried by the mounting member 6 of the field of view varying means of the present invention. It can be seen that the framing member 7 is formed with a rectangular opening 8 therein which restricts the field of view of the viewfinder in a predetermined manner depending on the relative dimensions between the opening 8 and the window 4 of the viewfinder.

The mounting member 6 is preferaby made of a transparent and elastic material such as a plastic.

In Fig. 2, it can be seen that the mounting member 6 is accurately positioned from the front wall of the camera housing 1 by projecting members 9 and 10 of the mounting member 6. Similarly, the curved end portions 11 and 12 of the mounting member 6 can be attached to the camera housing by cooperating with projections 15 and 16 of the camera housing 1. It can be seen that the free end portions 13 and 14 of the curved ends 11 and 12, respectively, can be moved away from each other by pressure on the side portions 21 and 22 of the mounting member 6 so that the free end portions 13 and 14 may be moved past the projections 15 and 16 and clamped thereon when the mounting member 6 is released.

The side portions 21 and 22 are formed with grooves 23 so that the elastic member 6 can be properly expanded and compressed for mounting and dismounting of the mounting member 6.

In order to accurately position the mounting member 6 on the camera housing 1, position fixing means are provided on the housing and position locating means are provided on the mounting member 6. The position fixing means of the camera housing 1 includes projections 19 and 20 which cooperate with inwardly projecting portions 17 and 18 of the mounting member to accurately position the vertical and horizontal mounting positions of the mounting member 6.

In Fig. 2 it can be seen that an auxiliary lens 5 may be attached to the objective lens 2 in a conventional manner.

In operation, the camera is supplied with a single objective lens 2 and a single viewfinder 4. The relative positions of the viewfinder and objective lens and the dimensions of the opening of the viewfinder 4 in the front wall of the camera housing 1 are so chosen that the field of view seen by the eye of the cameraman will correspond substantially to the field of view seen by the film through the objective lens 2. For practical purposes, the viewfinder opening and objective lens are chosen so as to be the ones which would normally be used for a large variety of purposes. In this manner, the camera can be used for its desired purposes without the necessity of carrying the additional weight around which might be due to a revolving turret, for example.

In the event that auxiliary lens is to be used for the camera or that the objective lens 2 is to be changed to a different lens, having a different focal length, a mounting member 6 is attached to the camera housing 1. The mounting member 6 is chosen to have the proper framing device 7 therein for limiting, in this example, the field of view seen through the viewfinder 4. It can be seen that the mounting member 6 is very light and small in size so that it can be carried separately from the camera housing without any undue difficulties. When the original objective lens 2 is again to be used, the mounting member 6 is merely slipped off from the camera housing.

Figure 3:
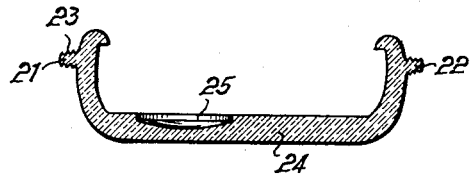
Fig. 3 is a sectional view of a second embodiment of the present invention.

Referring now to Fig. 3, a second embodiment of the view varying arrangement of the present invention is illustrated. In this arrangement the view varying means includes a lens 25 which is formed or carried in the mounting member 24. That is, the lens 25 may be a separate glass or plastic lens attached to the mounting member 24. On the other hand, the lens 25 may be actually molded in the plastic molding member 24 so that the entire arrangement of Fig. 3 is made out of one member.

As before, the mounting member 24 is provided with side projections 21 and 22 having a grooved area 23.

In the arrangement of Fig. 3 the lens 25 is positioned over the opening 4 of the viewfinder with the axis of the lens preferably aligned with the axis of the viewfinder. This alignment is provided by the position fixing members 19 and 20 of the camera housing 1 and the position locating portions 17 and 18 of the mounting member 24. The position locating portions 17 and 18 are not shown in Fig. 3 since this is a transverse sectional view taken substantially through the center thereof, where the projections 17 and 18 do not appear.

With the arrangement of Fig. 3, it can be seen that the lens 25 may either increase or decrease the field of view seen through the viewfinder depending upon the type and position of the lens used. It is of course apparent that the lens 25 is chosen to correspond to the objective lens to be used on the camera.

Figure 4:
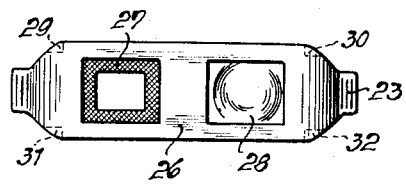
Fig. 4 is a front elevational view of still another embodiment of the present invention.

Referring now to Fig. 4 still another embodiment of the present invention is shown. In this embodiment both a framing means 27 and a lens 28 are both carried on a mounting member 26. The mounting member 26 is formed with four projecting portions 29, 30, 31 and 32 similar to the portions 17 and 18 shown in Fig. 2. The projection portions 29—32 permit the accurate alignment of the mounting member 26 on the camera housing 21 in cooperation with the projections 19 and 20 on the camera housing.

With the embodiment of Fig. 4 it is possible to have two different view varying means carried by the same mounting member 26. If the mounting member 26 is attached to the camera housing in the position shown in Fig. 4, it is apparent that the framing means 27 will be aligned with the viewfinder 4 to vary the field of view in a predetermined manner depending upon the dimensions of the opening in the frame means 27.

However, if the position of the mounting member 26 is changed by 180°, it can be seen that the lens 28 would then be aligned with the viewfinder opening 4. This second view varying means, namely, the lens 28, can vary the field of view of the viewfinder by a different amount. In this manner, the mounting member 26 can be used with two different objective lenses. If desired, for example, the field of view may be decreased by the framing means 27 for one changed lens or increased by the lens 28 for another changed objective lens.

The mounting members are preferably made of elastic and transparent material so as to be easily attached to the camera housing and to permit the proper gripping of the camera housing by the mounting members.

It will be understood that each of the elements described above, or two or more together, may also find a useful application in other types of camera arrangements differing from the types described above.

While the invention has been illustrated and described as embodied in view varying means for a viewfinder used in a camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various appliactions without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera arrangement, in combination, a camera housing formed with position fixing means fixed to said housing and having a front wall and a pair of opposite side walls formed with hook-receiving means; a view finder positioned in said camera housing and including a viewfinder window in said front wall thereof; a substantially band-shaped mounting member formed of resilient material and being provided with position locating means cooperating with said position fixing means of said housing to accurately locate said mounting member in at least two different mounting positions on said camera housing and having hook-shaped end portions detachably engaging respectively said hook-receiving means on said opposite side walls of said housing and having an elongated front portion extending between said hook-shaped end portions and being located in a plane substantially parallel to said front wall of said camera housing across said front wall when said band-shaped mounting member is attached by said hook-shaped end portions to said camera housing, said front portion of said mounting member being flexible only transverse to said plane so that said hook-shaped end portions may be easily disengaged from said hook-receiving means by flexing said front portion of said mounting member transverse to the plane thereof; and at least two different laterally spaced view varying means fixedly carried by said elongated front portion of said mounting member and alternatively located in front of said viewfinder window in said different mounting positions, one of said view varying means cooperates with said viewfinder in one of said mounting positions to vary the field of the viewfinder in a predetermined manner and the other of said view varying means cooperates with said viewfinder in the other of said mounting positions to vary the field of the viewfinder in a different predetermined manner.

2. In a camera having a viewfinder opening in the front wall of the camera housing, in combination, attaching means on the camera housing; an independent elongated reversible mounting member formed from resiliently flexible material and having a pair of opposite end portions adapted to be resiliently attached to said attaching means to attach thereby said elongated mounting member in two positions, namely, in a first position in which a portion of said mounting member is located in the region of said viewfinder opening and—after detachment—in a second through 180° reversed position in which a second portion of said mounting member is located in the region of said viewfinder opening; first view varying means on said mounting member in said first portion of said mounting member so as to be located in front of the viewfinder opening when said mounting member is in said first position thereof; and second view varying means on said mounting member in said second portion thereof so as to be located in front of said viewfinder opening when said mounting member is in said second reversed position thereof, whereby said two view varying means may be placed alternatively in front of said viewfinder opening by flexing said mounting member for detaching said mounting member from said camera housing and reattachment thereof in reversed position.

References Cited in the file of this patent

UNITED STATES PATENTS

| | | |
|---|---|---|
| 2,187,246 | Nerwin | Jan. 16, 1940 |
| 2,303,208 | Gehrke | Nov. 24, 1942 |
| 2,389,282 | Stegeman | Nov. 20, 1945 |
| 2,509,833 | Miller | May 30, 1950 |
| 2,607,275 | Peterson | Aug. 19, 1952 |
| 2,641,965 | Valenza | June 16, 1953 |
| 2,653,528 | Mueller | Sept. 29, 1953 |
| 2,953,981 | Leitz | Sept. 27, 1960 |

FOREIGN PATENTS

| | | |
|---|---|---|
| 746,974 | Germany | Sept. 1, 1944 |
| 935,886 | Germany | Dec. 1, 1955 |
| 517,200 | Italy | Feb. 26, 1955 |